US012269207B2

United States Patent
Vanelli et al.

(10) Patent No.: US 12,269,207 B2
(45) Date of Patent: Apr. 8, 2025

(54) BIODEGRADABLE PLASTICS FOR USE IN ADDITIVE MANUFACTURING PROCESSES

(71) Applicant: EOS of North America, Inc., Novi, MI (US)

(72) Inventors: Donald L. Vanelli, Novi, MI (US); Richard B. Booth, Novi, MI (US); Karl Freihart, Novi, MI (US)

(73) Assignee: EOS of North America, Inc., Novi, MI (US)

( * ) Notice: Subject to any disclaimer, the term of this patent is extended or adjusted under 35 U.S.C. 154(b) by 571 days.

(21) Appl. No.: 17/367,943

(22) Filed: Jul. 6, 2021

(65) Prior Publication Data

US 2021/0331382 A1 Oct. 28, 2021

Related U.S. Application Data

(63) Continuation-in-part of application No. 17/143,576, filed on Jan. 7, 2021, now Pat. No. 11,578,201.
(Continued)

(51) Int. Cl.
*B29C 64/153* (2017.01)
*B29K 23/00* (2006.01)
(Continued)

(52) U.S. Cl.
CPC ............ *B29C 64/153* (2017.08); *B33Y 10/00* (2014.12); *B33Y 70/00* (2014.12); *B33Y 80/00* (2014.12);
(Continued)

(58) Field of Classification Search
CPC ....... B29C 64/153; B33Y 10/00; B33Y 70/00; B33Y 80/00; B29K 2023/12; B29K 2075/00; B29K 2077/00
See application file for complete search history.

(56) References Cited

U.S. PATENT DOCUMENTS 10,583,482 B2 * 3/2020 Heugel .................. B22F 12/88
2008/0103232 A1   5/2008 Lake et al.
(Continued)

FOREIGN PATENT DOCUMENTS

AU         696330      9/1998
DE        4410046      5/1995
(Continued)

OTHER PUBLICATIONS

PCT Search Report and Written Opinion for Application No. PCT/EP2021/068508, dated Mar. 14, 2022, 13 pages.
(Continued)

*Primary Examiner* — Rick K Chang
(74) *Attorney, Agent, or Firm* — Polsinelli

(57) ABSTRACT

Disclosed is a plastic powder for use as a building material for the additive manufacturing of a three-dimensional object by selective solidification of the building material at the points corresponding to the cross-section of the three-dimensional object in the respective layer by exposure to radiation, wherein the plastic powder comprises polymer-based particles and an additive for imparting biodegradability in an amount of 0.05 to 5% by weight based on the weight of the polymeric components in the polymer-based powder. Further disclosed is a method for the production of such powder, methods for the production of three dimensional objects using such powder as well as three dimensional objects, which have been prepared accordingly, as well as the use of corresponding additives to impart biodegradability to three dimensional objects, which have been prepared accordingly.

14 Claims, 2 Drawing Sheets

Related U.S. Application Data

(60) Provisional application No. 62/958,353, filed on Jan. 8, 2020.

(51) Int. Cl.

| | | |
|---|---|---|
| *B29K 75/00* | (2006.01) | |
| *B29K 77/00* | (2006.01) | |
| *B33Y 10/00* | (2015.01) | |
| *B33Y 70/00* | (2020.01) | |
| *B33Y 80/00* | (2015.01) | |

(52) U.S. Cl.
CPC ...... *B29K 2023/12* (2013.01); *B29K 2075/00* (2013.01); *B29K 2077/00* (2013.01)

(56) References Cited

U.S. PATENT DOCUMENTS

| | | |
|---|---|---|
| 2013/0337530 A1 | 12/2013 | Lake et al. |
| 2017/0362418 A1 | 12/2017 | LaPray et al. |
| 2019/0211179 A1* | 7/2019 | Vucak ............... C08J 3/124 |
| 2019/0256681 A1 | 8/2019 | LaPray et al. |
| 2020/0140706 A1 | 5/2020 | Pfister et al. |

FOREIGN PATENT DOCUMENTS

| | | |
|---|---|---|
| KR | 20190081840 | 7/2019 |
| WO | 2014167518 | 10/2014 |
| WO | 2020099236 | 5/2020 |

OTHER PUBLICATIONS

Database WPI Week 201963 Thomson Scientific, London, GB; AN 2019-62410G, 3 pages.

Shuai, C. et al "Montmorillonite reduces crystallinity of poly-l-lactic acid scaffolds to accelerate degradation" Polymers for Advanced Technologies 2019, 30, pp. 2425-2435).

B. Panganiban et al., Science 2018, V. 359, I. 6381, pp. 1239-1243.

* cited by examiner

BIODEGRADABLE PLASTICS FOR USE IN ADDITIVE MANUFACTURING PROCESSES

FIELD OF THE INVENTION

The present application concerns a plastic powder for use as a building material for the additive manufacturing of a three-dimensional object by selective solidification of the building material at the points corresponding to the cross-section of the three-dimensional object in the respective layer by exposure to radiation, wherein the plastic powder comprises polymer-based particles and an additive for imparting biodegradability in an amount of 0.05 to 5% by weight based on the total weight of the polymeric components in the polymer-based powder. The present application further concerns methods for the production of such powder, methods for the production of three dimensional objects using such powder, as well as three dimensional objects, which have been prepared accordingly, and the use of corresponding additives to impart biodegradability to three dimensional objects, which have been prepared with corresponding additives.

BACKGROUND

Plastics are industrially mass produced and at the same time are widely used in daily life and in industrial fields with an ever-increasing usage over the past years. However, while their durability and resilience against natural degradation under conditions of use is an advantage, it turns to a disadvantage if plastic articles are discarded or blown away, thus ending up in nature or rivers, where they are eventually flushed into the sea. In this environment, the breakdown of plastic articles can take up to several hundred years, which has led to the accumulation of vast garbage patches in the oceans and plastics being present virtually on any place of the earth.

Current efforts to reduce these problems primarily aim at collecting plastic items with the aim of reuse. This is done either by sorting them into plastics of the same type before reprocessing (also called mechanical recycling), or by chemical or physical recycling, where the plastics are degraded in a controlled manner to provide building blocks, which can again be converted into new plastics. A problem of reprocessing is, however, that during their regular lifetime polymers in plastic articles are partially degraded in the environment, e.g. when exposed to sunlight, where polyolefins are degraded and partially oxidised by UV-generated radicals or reaction with atmospheric oxygen.

Another approach, by which it has been tried to reduce the negative impact of plastics on the environment, is the provision of plastics from natural resources, which can be more easily degraded by microorganisms in the natural environment. Possible types of such material include lignin (a constituent of regular wood), cellulose and polyhydroxy-acids (such as most notably polylactic acid), which can be produced by fermentation processes. However, a downside of this approach is that the spectrum of "renewable plastics" is limited and not all properties of conventional "non-renewable" plastics can be provided with the available materials. In addition, e.g. for polylactic acid, the degradation is only sufficiently fast at higher temperatures, which may not be met if articles are discarded in the environment.

A more recent approach to increase biodegradability of regular plastic products is to modify the products with additives to promote a later biodegradation. The advantage of some of these additives is that they can be used at low dosage levels, which avoids that the additives seriously affect the mechanical properties of the conventional plastics, into which they are incorporated.

An example of such materials are so called OXO additives (e.g., such as PDQ-M, PDQ-H, BDA, and OxoTerra™ from Willow Ridge Plastics), which initiate structural fragmentation or degradation of the articles, into which they are incorporated, thus accelerating the physical deterioration of the plastic article. Another example of a degradation promoting additive is described in US 2013/337530, which suggests the combination of a mixture of a furanone, a C2-C18 carboxylic acid compound (in particular glutaric acid) and a conventional polymer (which is not readily biodegradable). Corresponding combinations were then found to be biodegradable under short and long-term anaerobic and aerobic conditions.

A yet further example of such materials is provided in U.S. Patent Application Publication No. 2017/362418, the contents of which are incorporated by reference herein, which describes the incorporation of starch-based additive/plasticizer mixtures into regular plastic materials including polyolefins, polyesters, polystyrene, ABS, nylon, polyvinyl chloride, or polycarbonate. One downside of this approach is on the other hand, that to provide the desired degradation relatively high quantities of additive (such as about 10 or 20 wt.-%) were necessary.

In production, 3D-printing is now becoming more and more popular even for the production of larger article series as the technology advances and 3D-printing equipment is becoming available, which can produce several or even dozens of articles in a single printing run. Given the materials, which are regularly used for 3D-printing (such as polypropylene, polyurethanes and polyamides), most of the articles will only have a very low biodegradability, so that possible waste from 3D-printed objects is becoming more and more of a concern. This also applies to 3D-printing powders, which usually have sizes in the micron range and thus from the start form "micro plastics". Accordingly, in recent years there has been a need for 3D printable plastics that can be biodegraded in natural environments.

The provision of corresponding materials is complicated by the frame requirements, which materials to be processed by additive manufacturing have to meet. For example, in the current state of the art powder bed additive manufacturing processes, a powder of plastic material particles is layerwise applied on a substrate and then molten and re-solidified at the desired space positions by irradiation with light, either directly or after application of an absorber containing ink, which facilitates melting of the plastic when the entire layer is irradiated with electromagnetic radiation. As the accuracy of objects formed in this manner is dependent on the "smoothness" of the layer prior to melting/solidification of the material, properties such as the flowability of the powder and the avoidance of static effects is of significant importance for the process. Accordingly, there is a significant risk that additives, which are additionally incorporated into such powder, have a negative impact on the powder characteristic and may even compromise the surface and mechanical quality of objects thus prepared.

As further characteristic, which an additive to polymer powders intended for additive manufacturing processes would have to meet, is that it must not noticeably interfere with the melting and re-solidification of the polymer, to which it is added. Otherwise there is a fear that mechanical characteristics of objects thus prepared will deteriorate. Finally, an additive, which is intended for additive manufacturing, must be capable to survive the additive manufacturing process itself, where often the material is kept at temperatures just below the melting temperature of the polymer (to ensure melting with minimal energy input from the radiation source) and where the melting may be triggered by high energy light beams. Here, an additive to provide improved biodegradability must be stable at these conditions without substantial degradation or unwanted discoloration.

SUMMARY OF THE INVENTION

Based on these preconditions, the present application aims at providing polymer powders for additive manufacturing processes, as well as three dimensional objects prepared from such powders, which have improved biodegradability under environmental conditions.

In the investigations underlying the present invention, it has unexpectedly been found that the above object can be achieved by a plastic powder into which 0.05 to 5% by weight, based on the weight of polymeric components, of a biodegradability imparting additive have been incorporated.

Accordingly, in a first aspect, the present application provides a plastic powder for use as a building material for the additive manufacturing of a three-dimensional object by selective solidification of the building material at the points corresponding to the cross-section of the three-dimensional object in the respective layer by exposure to radiation, wherein the plastic powder comprises polymer-based particles and an additive for imparting biodegradability in an amount of 0.05 to 5% by weight based on the weight of polymeric components in the polymer-based powder.

In the above, the "polymer" in the polymer-based particles is regularly a polymer from renewable or non-renewable resource, which has a natural biodegradability under ASTM D 5511-18 conditions of less than 2% and preferably less than 1.5% after 205 days. An example of a polypropylene would be less than 2% in 537 days. If the polymer is a polymer, which is more readily degradable in the natural environment (such as a polyamide or polyester polymer), the polymer may also have a natural biodegradability under ASTM D 5511-18 conditions of less than 15% and preferably 10% or less after 3 months.

The "additive for imparting biodegradability" in the context of this invention is a material or mixture of materials, which increases the biodegradation rate of a polymer material, into which it is incorporated, by a least a factor of 1.5 compared to the biodegradation rate of the base material, which is formulated without the additive. Preferably, the additive increases the biodegradation of the polymer material by a factor of at least 2.0, more preferably at least 3.0. For comparative purposes, the factor here is determined at an amount of additive of 1 wt.-% (99 wt.-% polymer material) under ASTM D 5511-18 conditions.

In one embodiment, the polymer-based powder will to the greater part comprise polymer, e.g. the content of polymer in the polymer-based powder is preferably at least 85 wt.-%, more preferably at least 90 wt.-% and even more preferably at least 95 wt.-%. In another embodiment, the polymer-based powder comprises a relevant quantity of fillers, such as up to 60 wt.-% or in the range of 30 wt.-% to 55 wt.-%. In this case, the content of the of polymer in the polymer-based powder is preferably at least 85 wt.-%, more preferably at least 90 wt.-% and even more preferably at least 95 wt.-% of the non-filler constituents.

Regularly, the additive for imparting biodegradability will be a material, which can be used by microbes as a nutrition source and which may comprise substances which attract microbes, which later degrade the polymer materials. Preferably, the additive is not soluble in the polymer and in the polymer forms a dispersion of finely distributed additive.

As the amount of additive in the inventive plastic powder is limited to 5 wt.-% or less, it is in most cases ensured that the powder properties are not seriously affected by the additive. Improved biodegradation will also appear at higher levels. On the other hand, if the amount of additive is less than 0.05 wt.-% the effect of the additive to promote the biodegradability of the polymer material forming the plastic powder may be small. Additive amounts to provide an optimized compromise of tolerable change of powder characteristics and improvement of biodegradability are amounts of at least 0.1 and/or at most 3% by weight, preferably at least 0.2 and/or at most 2.5% by weight and more preferably at least 0.5 and/or at most 2% by weight, wherein the %-weight is calculated on the weight of polymeric components in the polymer-based powder.

For the effect of improving the biodegradability of objects prepared from the inventive plastic powder, it is regularly sufficient that the additive is incorporated into the object. To achieve this, prior to object formation it is not necessary that the additive is incorporated into the plastic powder, as on melting the polymer and the additive will become intimately mixed. Thus, in one embodiment, the inventive plastic powder is a physical mixture of polymer powder particles and discrete additive particles or polymer powder particles having a discrete additive coating. On the other hand, if the additive is present in the plastic powder in discrete form, there is a higher risk that the additive may impact the flow characteristics of the polymer and/or particle coalescence, especially, if the particles of the additive are smaller than the polymer particles. Thus, in a preferred embodiment of the inventive plastic powder, the additive is incorporated into the polymer-based particles. The preparation of such mixed plastic powders is possible e.g. by mixing the additive and polymer materials in a melt and by subsequent processing of the melt to a powder with appropriate technology (see below) or by precipitation of a mixture of polymer and additive in a non-solvent.

In one embodiment, the additive for imparting biodegradability to the plastic powder contains a component selected from starch and/or starch mixtures, mixtures of organic acids and polyesters, in particular in the form of aliphatic polyesters, and fractal polymers. A preferred fractal polymer is fractal ε-caprolactam, in particular fractal ε-caprolactam as prepared in AU696330 B2.

Examples of starches, which can be used as biodegradability imparting additives, include those produced from one or more plants, such as corn starch, tapioca starch, cassava starch, wheat starch, potato starch, rice starch, sorghum starch, and the like. In some embodiments, a mixture of different types of starches may be used.

In a preferred embodiment, the additive comprises at least one starch and a plasticizer. Suitable plasticizers for combination with starches include e.g. glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, other acid esters, or combinations thereof. Glycerin is preferred as a plasticizer. If the biodegradability imparting additive is a mixture of starch and plasticizer, the plasticizer content therein is suitably at least 12%, preferably at least 15%, more preferably at least 18%, more preferably at least 20%, and more preferably at least 22%, but no greater than 35%, preferably no greater than 32%, more preferably no greater than 30%, more preferably no greater than 28%, and more preferably no greater than 25% by weight, relative to the combined weight of starch and plasticizer. Particularly suitable mixtures are described e.g. in US 2017/362418 A1.

In a preferred embodiment, the biodegradability imparting additive as described above further contains a fatty acid to make it more compatible with the polymer of the plastic powder.

In another preferred embodiment, the biodegradability imparting additive comprises a chemo attractant compound, i.e. an inorganic or organic substance, which is capable to induce chemotaxis in motile cells (i.e. movement of the cells towards the origin of the substance). Compounds with this property include i.a. sugars or furanones, especially 3,5-dimethylpentenyl-dihydro-2(3H)furanone isomer mixtures, emoxyfurane and N-acylhomoserine lactones.

Other possible compounds for use as chemo attractant compounds include, but are not limited to galactose, galactonate, glucose, succinate, malate, aspartate, serine, fumarate, ribose, pyruvate, oxalacetate and other L-sugar structures and D-sugar structures. Examples of bacteria, which are attracted to such sugars include, *Escherichia coli*, and *Salmonella*. In a preferred embodiment the sugar is a non-esterified starch.

In addition, or alternatively, the biodegradability imparting additive comprises a carboxylic acid compound with chain length from 5-18 carbons. As a preferred carboxylic acid compound, glutaric acids and its derivatives, and hexadecanoic acid compounds, especially palmitic acid, can be mentioned.

In addition to the carboxylic acid compound and/or the chemo attractant compound, the additive may also comprise a polymer, which is preferably selected from polydivinyl benzene, ethylene vinyl acetate copolymers, polyethylene, polypropylene, polystyrene, polyterephthalate, polyesters, polyvinyl chloride, methacrylate, polycarbonate, polyamide, e.g. nylon 6, and any copolymers of said polymers. These polymers can be added to improve compatibility of the additive with the polymer material, into which the additive is incorporated.

Moreover, in addition to the carboxylic acid compound and/or the chemo attractant compound, the additive may also comprise a swelling agent, preferably selected from the group comprising natural fiber, cultured colloid, cyclodextrin, polylactic acid, or the like.

In a particularly preferred embodiment, the biodegradability imparting additive comprises a mixture of a furanone compound, a glutaric acid, a hexadecanoic acid compound, a polycaprolactone polymer, a swelling agent and a carrier resin to assist with placing the additive material into the polymeric material to be rendered biodegradable (i.e. a polymer of the same type, into which the additive is incorporated in the plastic powder).

In a further preferred embodiment, the biodegradability imparting additive includes an organic carboxylic acid such as at least one of glutaric acid and palmitic acid. Additional alternatives and guidelines for suitable options in choice of the biodegradability imparting additive as provided in US 2008/103232 which is incorporated herein by reference in its entirety; such additives are commercially available as EcoPure® from Bio-Tec Environmental.

Especially suitable biodegradability imparting additives for use in the inventive plastic powder include:

Ecopure EVA Powder EP-06P-EVA. EP-06P-EVA is typically used in concentrations around 1% by weight in and is most effective for producing biodegradability in polypropylene, nylons, and thermoplastic elastomers. EP-06P-EVA powder further classified to remove particles in excess of 200 microns and added in a 1% by weight mixture to EOS PA 2200, EOS PA 1101 and a specialty polypropylene manufactured by Braskem and powderised by Advanced Laser Materials, LLC of Temple, TX ("PP 05") are specific mixtures embodied.

Ecopure EP-04C-NY. A pelletized material suitable for either powderising and dry mixing or melt mixing, which features a high melting point of 220° C. which is advantageous for mixing with EOS PA 2200 (polyamide) which has a melting point in powder form of 184° C. EP-04C-NY has the advantage that it does not melt at the processing temperature in selective laser sintering (e.g. 180° C.). However, it would melt under the temperature of the laser when the PA 2200 is melted to form an object. EP-04C-NY can advantageously be used in concentrations around 0.5% by weight.

Ecopure EP-01B-EVA. EP-01B-EVA is similar to EP-04C-NY, but offers the additional advantage of having higher melt flow (measured at 10-28 g/10 minutes at 190° C., 2.16 kg according to ASTM D1238). This higher melt flow provides the advantage of more efficient mixing during compounding and thus easier processing of the polymer-additive blend.

Another commercially available biodegradability imparting additive is BS-201j additive from BioSphere Plastic LLC.

The above types of biodegradability imparting additive are preferred in the context of the present invention.

Other non-limiting examples of suitable biodegradability imparting additives, which can be used individually or in addition to the biodegradability imparting additives as described above, include Nor-X Intelligent additives such as Renatura®, microbiodegradable plastics such as Earth Nurture Additive (available from BioGreen Products), oxobiodegradation additives such as PDQ, PDQ-H and BDA (available from Willow Ridge Plastics), polystarch additives (available from Willow Ridge Plastics), and the like.

Yet further non-limiting examples of possible biodegradability imparting additives, which can be used individually or in addition to the biodegradability imparting additives as described above, include enzymes, crystallization inhibitors, nucleating agents and salts.

Possible enzymes include e.g. Nylonase (especially in combination with polyamide 6), manganese peroxidase, or *Burkholderia cepacium* lipase (BC-lipase) and protein K (especially for combination with polylactic acid and polycaprolactone). To protect such enzymes from losing their activity, the enzymes can be formulated with an enzyme protectant such as four-monomer random heteropolymers, which are e.g. described in B. Panganiban et al., Science 2018, V. 359, I. 6381, pp. 1239-1243.

Possible crystallization inhibitors include e.g. montmorillonite (especially in combination with PLLA, see Shuai, C. et al "Montmorillonite reduces crystallinity of poly-1-lactic acid scaffolds to accelerate degradation" Polymers for Advanced Technologies 2019, 30, pp. 2425-2435).

Possible salts are in particular salts that induce a change in pH-value to support degradation (depolymerisation) and thus act as catalysts, such as e.g. acetate (in particular potassium, sodium or calcium acetate) and formate salts (in particular sodium formate), or hygroscopic salts, which provide mild basic conditions when brought in contact with water (e.g. in the form of sodium carbonate).

As concerns the polymer, from which the polymer-based particles of the plastic powder are at least to the major part made up, the invention is not subject to any relevant restrictions, except that as noted above, the polymer is a polymer which can be processed to a three-dimensional object by an additive manufacturing process and which by itself has no satisfactory biodegradation. Examples of suitable polymers for the purposes of the invention include in particular polymers, co-polymers or polymer blends selected from polyamides, polyolefins, in particular in the form of polyethylene or polypropylene, polystyrene, polyaryletherketones (PAEK), in particular polyether ketone ketone or poly ether ketone, thermoplastic polyurethanes, polyesters, polyethers, polyhydroxy acids, polylactide, polyphenylene sulfide, polyphenylene oxide, polyimide, polyetherimide, polycarbonate and poly ether block amides (PEBA). Preferably, the polymer base is formed from one of these polymers. The term "polymers" here also includes oligomers with a cyclic or ring-shaped molecular structure.

Suitable PAEK polymers and copolymers, for example, are selected from the group consisting of polyether ether ketone (PEEK), polyether ketone ketone (PEKK), polyether ketone (PEK), polyether ether ketone ketone (PEEKK), polyether ketone ether ketone ketone (PEKEKK), polyaryletheretheretherketon (PEEEK) and copolymers, which include at least one of the aforementioned polymers.

In a particularly preferred embodiment, the polymer is selected from polyamides, especially in the form of polyamide-5.6, polyamide-5.10, polyamide-6, polyamide-6.6, polyamide-6.13, polyamide-11, polyamide-12, polyamide-10.12 or polyamide 12.12. Even more preferably, the polymer is selected from polyamide-11 and polyamide-12. Another particularly preferred polymer is polypropylene. Yet another particularly preferred polymer is a polyether block amide (PEBA).

Next to the biodegradability imparting additive the plastic powder may comprise additives which are conventionally used in plastic powders for additive manufacturing processes, such as flowing agents, anti-agglomeration agents, reflection particles and/or pigments. A suitable type of reflection particles comprises for example $TiO_2$, which can be incorporated into the plastic powder in dry form. A suitable flowing agent and/or anti-agglomeration agent is e.g. carbon black or pyrogenic silica. A particular preferred type of additive, which may be used to impart absorption properties at a wavelength, where polymer materials do not absorb light, are IR or NIR radiation absorbing materials, such as the carbon black types described in WO 2020/099236 A1. Such materials may be present separately in a mixture with the polymer-based particles, absorbed onto the surface of the particles or incorporated into the particles. Moreover, technical polymers typically contain stabilizers (e.g. antioxidants, UV-stabilizers), chain growth limiters and/or other additives for controlling the polymerization reaction (e.g. acidic buffer systems), functional additives (e.g. flame retardants) and/or intended or unintended contaminants from polymerization or powderization processes (e.g. catalysts, compatibilizers, processing aids).

In the practice of the invention, the particle size of the polymer-based particles will regularly be in a range, which is suitable for processing via additive manufacturing. Preferably, the polymer-based particles have a mean particle diameter $D_{50}$, determined by means of laser diffraction (according to ISO 13320:2020), in the range from about 20 to 100 µm, preferably the mean particle diameter is at least 30 µm and/or at most 90 µm and more preferably at least 40 µm and/or at most 80 µm.

Further, in the practice of the invention the plastic particles preferably have a biodegradability according to ASTM D 5511-18 after 83 days of at least 1 wt.-%, preferably at least 1.5 wt.-%, more preferably of at least 2 wt.-%, even more preferably at least 3 wt.-% and even more preferably a least 4 wt.-%, relative to the total weight of polymer, which forms the basis of the particles and/or a biodegradability according to ASTM D 5511-18 after 155 days of at least 2 wt.-%, preferably at least 3.5 wt.-%, more preferably at least 5 wt.-%, even more preferably at least 6 wt.-% and even more preferably a least 7 wt.-%, relative to the total weight of polymer, which forms the basis of the particles.

In a further aspect, the present invention concerns a method for the production of a plastic powder as described above, wherein polymer-based particles and additive are processed by mixing without adding a solvent, by coextrusion and subsequent one or more of milling, fiber spinning and fiber cutting, melt spraying, microgranulating, by complete or partly dissolution in a solvent of the compound or by adding the additives to the solution and precipitation and/or spray drying polymer-based particles with incorporated additive or by impregnation of the polymeric powder with a solution or dispersion of the additive in a fluid which might be a (partly) solvent or non-solvent to the polymeric powder. As noted above, in one embodiment the plastic powder may be prepared by mixing without adding a solvent to provide a dry blend or physical mixture of polymer and biodegradability imparting additive. In another embodiment, the polymer can be processed in a manner that at least the polymer is molten or liquefied and the biodegradability imparting additive is incorporated into polymer particles prepared from the melt. This can be accomplished e.g. by extruding the melt into pellets, fibers or other shape and subsequent size reduction into a powder which is suitable for use in powder bed fusion additive manufacturing method. Similarly, said polymer mixture could be extruded into other forms useful in other additive manufacturing processes, such as a filament for use in FDM, a process popularly commercialized by Stratasys Inc. In a yet further embodiment, the polymer can be dissolved in a solvent either with biodegradability imparting additive, which is also dissolved, or with particulate additive and the polymer can subsequently be precipitated by introduction of the mixture into a non-solvent or by altering the process conditions (temperature, pressure) to make the polymer insoluble in the solvent.

Optionally, after its production the plastic powder can be packaged, preferably with the exclusion of moisture.

In a yet further aspect, the present invention concerns a three-dimensional object, which is produced by solidification of a powdery building material at the points corresponding to the cross-section of the three-dimensional object in the respective layer by exposure to radiation, wherein a plastic powder as described above is used as the building material. As noted above, the building material in this case can be either a physical mixture of different materials and additives or can be a uniform material, wherein the polymers and additives have been combined in one type of particle. In the latter case, an advantage is that the materials can be formulated to have a more uniform particle size and behavior, which may be advantageous for later processing.

Alternatively, the three-dimensional object can also be prepared using a filament, which is formed from the same material as the above described plastic powder, and which for the preparation of an object is molten and placed on the space positions of the three-dimensional object to be prepared. This technology is also known as Fused Deposition Modeling (FDM). Yet in addition, the three dimensional object can be prepared by multijet modeling (wherein a liquid, light sensitive plastic material comprising the biodegradability imparting additive as noted above, is applied on a platform by means of a printing head and is cured by means of a radiation source, which is incorporated into the printing head), film transfer imaging (by 3D systems), Electrophotographic (EP) imaging and deposition (by Evolve Additive solutions) or any other technology, which has been described for 3D printing.

In a yet further aspect, the present invention concerns a method for producing a three-dimensional object, wherein a plastic powder as described in detail above is used as the building material and preferably the building material is selectively solidified by action of electromagnetic radiation emitted by a radiation source. In the method, the three-dimensional object is in particular produced by solidifying a powdery building material at the points corresponding to the cross-section of the three-dimensional object in the respective layers.

In one preferred embodiment, the method is a conventional laser sintering process, which uses a $CO_2$ laser or a light source which emits short-wave radiation, such as e.g. NIR radiation. In such process, the plastic powder is regularly applied layer-on-layer on a support or building platform and the positions, where a later object is to be generated, are solidified by activation/melting with a laser beam or a set of two or several laser beams.

In another embodiment, the solidification is accomplished by applying an ink on the parts of the layer, in with the object is later to be generated, and by subsequently irradiating the surface of the layer with a two dimensional light source of a wavelength, which is only absorbed by constituents of the ink. In this manner, the plastic material, which has been "marked" with the ink is selectively molten and can subsequently be solidified to the three-dimensional object. This kind of process is commercialized by the company HP as "Multi Jet Fusion". Surprisingly, the addition of the particles of the particulate additive offers the same advantages in both processes. In this embodiment, the additive for imparting biodegradability may be present in the plastic powder prior to application of the ink and/or in the ink, so that once the ink is applied, a plastic powder as defined above is formed.

As noted above the wavelength of the radiation source is not subject to any relevant restriction, provided that it allows for selective melting of the desired regions of the layer or positions of plastic powder. In one embodiment, the radiation source is a conventional $CO_2$ laser with a radiation wavelength of about 10.6 μm. In another embodiment, the radiation source is a CO Laser with a wavelength of in the range of 4.8 to 8.3 μm and preferably about 5 μm. In a yet further embodiment, the radiation source emits light of a wavelength in the range from 500 to 1500 nm, preferably in one of the wavelength ranges 1064±8 nm and/or 980±7 nm and/or 940±7 nm and/or 810±7 nm and/or 640±7 nm.

The radiation source to be used in the method preferably comprises at least one laser, and preferably at least one diode laser.

In a yet further aspect, the present invention concerns a system for the production of three-dimensional objects by solidifying a powdery building material at the points corresponding to the cross-section of the three-dimensional object in the respective layer, wherein the system has at least one radiation source that is designed to emit electromagnetic radiation, a process chamber that acts as an open container and is designed with a container wall, a carrier located in the process chamber, the process chamber and carrier being movable relative to one another in the vertical direction, having a storage container and a coater movable in the horizontal direction, wherein the storage container is at least partially filled with a plastic powder as described above.

A conventional system and method, which can be employed in the invention is known, for example, from DE 44 10 046, wherein a three-dimensional object is fabricated layer-by-layer—according to the principle of "additive manufacturing"—by repeated application of powder layers, selective melting (partially or completely) on the cross section of the object corresponding to respective positions and subsequent solidification of the melt. By melting the powder layer, the melt connects to the previously melted layer. An example of a laser sintering device with a laser beam and a deflection mirror, as is customary when using a CCL laser, is shown is FIG. 1. As can be seen in FIG. 1, the device has a container 1, which is open at the top and bounded at the bottom by a carrier 4 for carrying an object 3 to be formed. Through the upper edge 2 of the container (or its side walls) a working level 6 is defined. The object is located on the upper side of the carrier 4 and is formed from a plurality of layers of a powdery building material that can be solidified by means of electromagnetic radiation and extends parallel to the upper side of the carrier 4. The carrier can be height adjusted in the vertical direction, i.e. parallel to the side wall of the container 1. Thus, the position of the carrier 4 can be adjusted relative to the working plane 6.

Above the container 1 or the working plane 6, a deposition device 10 is provided for applying the powder material 11 to be solidified to the building platform 5 or a layer that has been solidified last. Furthermore, an irradiation device in the form of a laser 7, which emits a directed light beam 8, is arranged above the working plane 6. This is directed via a deflection device 9, for example a rotating mirror, as a deflected beam 8' in the direction of the working plane 6. This arrangement is common for a laser sintering system with a $CO_2$ laser. A control unit 40 enables control of the carrier 4, the application device 10 and the deflection device 9. The elements 1 to 6, 10 and 11 are arranged within the machine frame 100.

During the production of the three-dimensional object 3, the powder material 11 is applied in layers on the carrier 4 or a previously solidified layer and solidified with the laser beam 8' at the positions of each powder layer corresponding to the object. After each selective solidification of a layer, the carrier is lowered by the thickness of the powder layer to be applied next.

In the above system, the radiation source preferably emits light of a wavelength in the range from 500 to 1500 nm, preferably in one of the wavelength ranges 1064±8 nm and/or 980±7 nm and/or 940±7 nm and/or 810±7 nm and/or 640±7 nm. In another embodiment, the radiation source emits light of a wavelength of about 10.6 μm or in the range of 4.8 to 8.3 μm and preferably about 5 μm.

Alternatively, or in addition thereto, the radiation source in the system comprises at least one laser, preferably at least one diode laser. The laser diodes can be arranged in a cell shape or offset. In addition, it is possible that the laser diodes are arranged in a 2-dimensional array. The emitter can be an edge emitter. Preferably, the emitter is a surface emitter (VCSEL or Philips-VCSEL). High construction speeds can be achieved by line exposure. In addition, the use of laser diodes enables high efficiency and lowers energy costs.

Suitable laser diodes usually work with a power between 0.1 and 500 watts, preferably with at least 1.0 watts and/or at most 100 watts. The focus of the laser beam can have a radius between 0.05 mm and 1 mm, preferably of at least 0.1 mm and/or at most 0.4 mm.

The exposure speed, i.e. the speed of the laser focus relative to the building plane is usually between 10 mm/s and 20000 mm/s, preferably at least 300 mm/s and/or at most 10000 mm/s, more preferably at most 5000 mm/s.

In a yet further aspect, the present invention concerns the use of an additive to impart biodegradability in three-dimensional objects produced by additive manufacturing processes which are based on polymers and which are produced by the action of radiation by selective solidification of a powdery building material at the points corresponding to the cross-section of the three-dimensional object in the respective layer to improve the biodegradability of the objects, wherein the additive is incorporated into the starting material used for the production of the three-dimensional object in an amount of 0.05 to 5% by weight, based on the total weight of the polymeric components in the starting material.

In connection with the above aspects, it is noted that any preferred embodiment described hereinabove for one aspect is deemed to be likewise described as a preferred embodiment of the other aspects, even if for conciseness reasons the combination has not been explicitly described above. In addition, any combination of more or less preferred embodiments of an aspect is deemed to be described, as well as any combination of more or less preferred embodiments of an aspect with any other aspect as herein described above.

In the context of the present invention, the terms "comprising" or "containing" and their grammatical modifications have the following meanings: In an embodiment in addition to the elements mentioned other elements may be contained. In another embodiment, essentially only the elements mentioned are contained. In other words, in addition to their conventional meaning, in a particular embodiment the terms can be synonymous with the terms "essentially consisting of" or "consisting of".

DETAILED DESCRIPTION OF THE EMBODIMENTS

Figure 1:
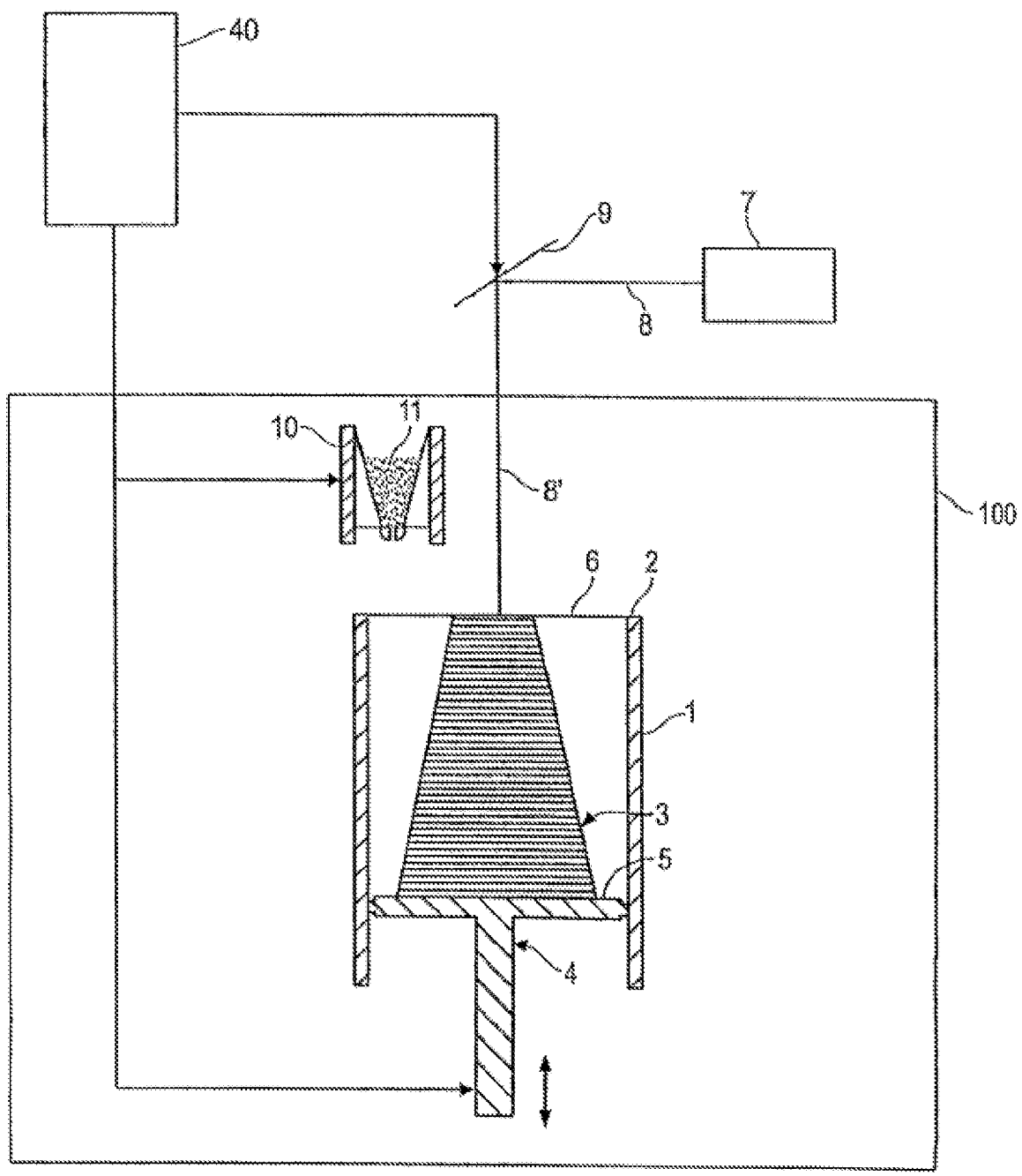
FIG. 1 shows an example of a conventional laser sintering device for the layerwise production of a three-dimensional object.

In the following, the present invention will be further described by means of examples, which are however only provided for illustration purposes and should not be construed in any manner as limiting to the invention as herein above described.

EXAMPLES

Example 1: Bio Degradation of PA11 with Different Degradation Additives

Several samples of polyamide 11 (Rilsan® PCG-LV by Arkema) were prepared which either contained no additive (control/NEG), 0.5 wt.-% of EcoTech/Eco pure MB-67 additive or 1 wt.-% of Biosphere BS-201j additive. The polyamide 11 is compounded with the additive on a twin-screw extruder to obtain the raw material for the tests. The respective materials were processed into powders of an average particle size as indicated in table 1 below using a cryogenic grinder.

Subsequently, standard test specimens of dimensions 6 inch×½ inch×⅛ inch according to ASTM D638 Type I were prepared to determine mechanical properties of the materials by means of a modified Integra ISI lasersintering system using standard polyamide 11 processing conditions.

The properties of the powder materials before and after preparation of the test specimens (for the material which is not molten during the process) are given in table 1. Thermal properties were measured by DSC according to standard ASTM D3418 with heating/cooling rates of 10K/min in a temperature range between 40° C.-230° C. using a DSC Q20 by TA Instruments. "eos" in table 1 designates the difference of extrapolated onset-temperature (=designed intersection point of the baseline and the inflectional tangent at the beginning of the melting and respective crystallization peak for first heating run and cooling run). Melting temperature refers to the peak temperature of the melting peak on the first heating run. Particle size is given as the D50 value, which was determined by laser diffraction using Microtrac Turbo-Sync with dry dispersion. Powder density is Apparent Density according to ASTM D1895. MFR designates the melt mass flow rate (according to ISO 1133) at 230° C., 1 kg load after 3 min dwell time using a melt density of 0.80 g/cm$^3$ measured with a Dynisco plastic 4004 melt flow indexer.

TABLE 1

| Sample | eos [° C.] | Melting temp. [° C.] | Average Particle size D50 [μm] | Powder density [g/cm$^3$] | MFR [g/10 min] |
|---|---|---|---|---|---|
| nylon-11 | 16 | 189.44 | 79.7 | 0.37 | 75.5 |
| nylon-11* | 16 | 189.50 | 76.6 | 0.38 | 53.4 |
| nylon-11 with MB-67 | 16 | 189.46 | 74.8 | 0.37 | 76.7 |
| nylon-11 with MB-67* | 17 | 189.86 | 67.2 | 0.33 | 49.7 |
| nylon-11 with BS201j | 17 | 189.64 | 80.1 | 0.39 | 77.4 |
| nylon-11 with BS201j* | 20 | 189.29 | 66.2 | 0.37 | 47.5 |

*Part bed powder material, which is not molten during the process (as received after lasersintering processing)

In Table 2, the mechanical properties of non-conditioned samples, as determined according to ASTM D 638 using an Instron 3365 mechanical tester with a 5 kN load cell, under laboratory conditions of 22° C. and 50% RH are provided. The part density was measured according to ASTM D792, Test method A.

TABLE 2

| Sample | Part Density [g/cm$^3$] | Tensile strength [MPa] | Tensile Modulus [MPa] | Elongation at break [%] |
|---|---|---|---|---|
| nylon-11 | 1.03 | 48 | 1673 | 23 |
| nylon-11 with MB-67 | 1.03 | 50 | 1586 | 27 |
| nylon-11 with BS201j | 1.03 | 49 | 1688 | 25 |

As can be seen from the above Tables 1 and 2, the powders prepared with biodegradation additive have very similar properties to powders without additive, so that they can replace conventional nylon-11 powder without the necessity to adjust processing parameters. Similarly, the mechanical properties are very similar for the processed materials, which shows that the incorporated additives do not negatively affect the processed products.

Figure 2:
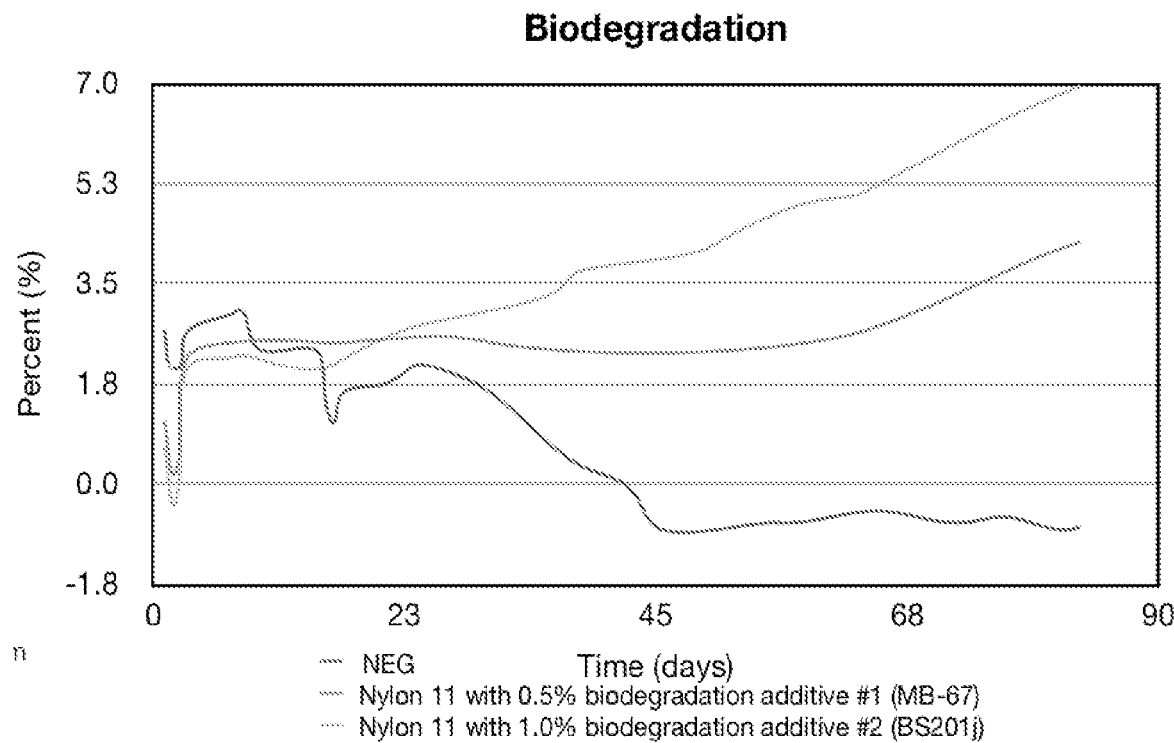
FIGS. 2 and 3 show the biodegradation behavior of nylon 11 without biodegradability imparting additive (neg) and with either 0.5% MB-67 or 1% BS-201j additive.
Figure 3:
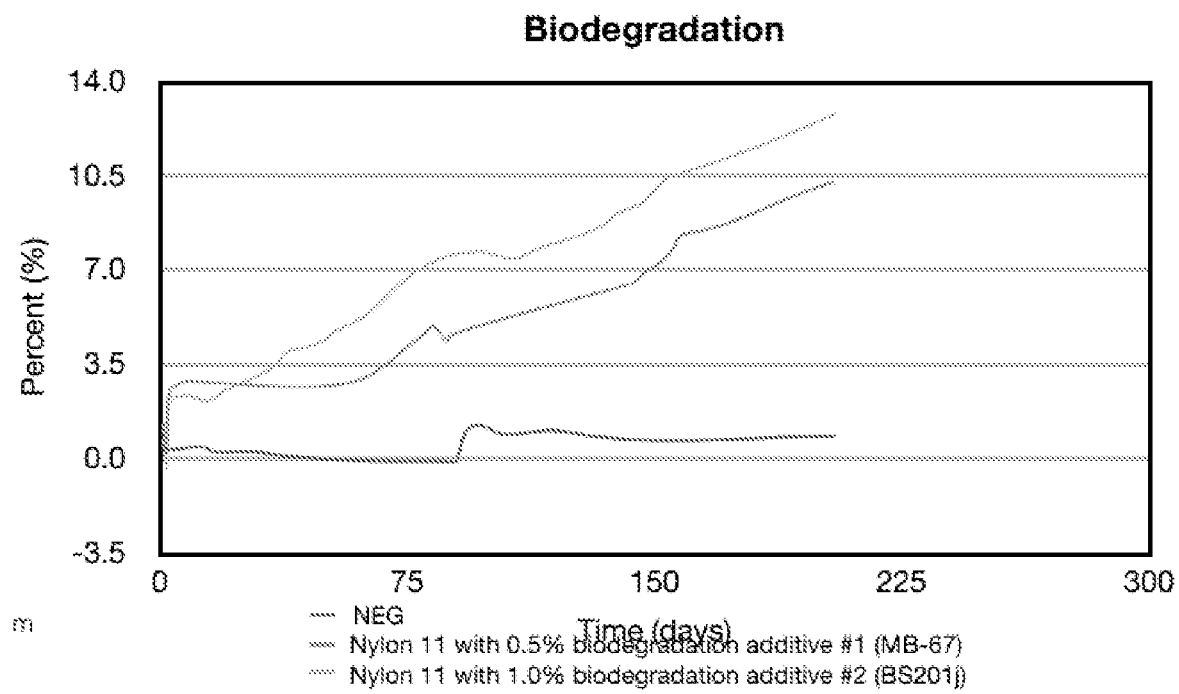

In the following, the respective material powders were subjected to biodegradation tests according to ASTM D 5511-18. The results of these tests are provided in the following Table 3, as well as in FIGS. 2 (for 83 days) and 3 (for 205 days).

TABLE 3

| Sample | Biodegradation according to ASTM D5511-18 [%] | | |
|---|---|---|---|
| | 83 days | 155 days | 205 days |
| nylon-11 | −0.7* | 0.8 | 0.8 |
| nylon-11 with MB-67 | 4.2 | 7.4 | 10.3 |
| nylon-11 with BS201j | 6.9 | 10.4 | 12.8 |

*increase in weight probably due to water absorption

Example 2 (Reference): Influence of Concentration and Degradation Time

Several samples of polypropylene (PP400) were prepared which either contained no additive (control), 1 wt.-% of Biosphere BS-201j additive or 2 wt.-% of Biosphere BS-201j additive. The samples are shaped as straws by conventional plastic processing techniques.

The respective test specimen were subjected to biodegradation tests according to ASTM D 5511-18. The results of these tests after 390 days and 537 days are provided in the following Table 4:

TABLE 4

| Sample | Biodegradation according to ASTM D5511-18 [%] | |
|---|---|---|
| | 390 days | 537 days |
| PP (control) | −2.3 | −0.1 |
| PP with 1% Biosphere additive | 19.6 | 24.4 |
| PP with 2% Biosphere additive | 34.4 | 39.2 |

The data in Table 4 shows that there is higher degradation with higher content of additive. Moreover, for longer times, the degradation is higher.

For samples produced by additive manufacturing, in particular by laser sintering, comparable behavior is expected.

Example 3: Biodegradation with Different Polymers, Corresponding Processing Conditions and Part Properties Different samples were prepared by compounding and grinding various base polymers with the biodegradation additive BS-201j delivered from Biosphere Plastics (see Table 5). For each sample, a reference without additive was produced with same conditions. Compounding, grinding, powder analysis and part production was performed according to the procedures in Example 1. For part production on the laser sintering system, the default process parameters for each material was used.

PP400 is a polypropylene commercially available from Advanced Laser Material LLC. TPE300 is a thermoplastic polyurethane, which is commercially available from Advanced Laser Materials LLC. PEBA/30% nylon 11 and PEBA/90% nylon 11 are experimental grades of the polyether block amide copolymer family available from Arkema under the tradename PEBAX®. The percentages refer to content of polyamide 11 in the copolymer.

Any test results besides the biodegradation test are given as relative values compared to the respective reference materials without biodegradation additive. Processing tests refer to the general processability of the powders on the lasersintering system, in particular the recoating behavior and thermal processing window. Mechanical properties refers to the elongation at break, tendencies are stated when outside the typical deviation range. Coloring refers to color of parts produced by lasersintering, evaluated by optical inspection.

| Base Polymer | BS-201j additive content | Processing tests | Mechanical Properties | Coloring | Biodegradation according to ASTM D5511-18 after X days [%] (reference values) |
|---|---|---|---|---|---|
| PP400 | 1% | no impact | 15% loss | Similar color | Tbd (tbd) |
| TPE300 | 1% | no impact | no difference | Similar color | Tbd (tbd) |
| TPE300 | 2% | no impact | no difference | Similar color | Tbd (tbd) |
| PEBA/90% nylon 11 | 2% | no impact | 20% loss | discolored | Tbd (tbd) |
| PEBA/30% nylon 11. | 1% | no impact | tbd | discolored | Tbd (tbd) |

The invention claimed is:

1. A building material used in additive manufacturing of a three-dimensional object by selective solidification at points of respective layers corresponding to cross-sections of the three-dimensional object by exposure to radiation, wherein the building material comprises:
    polymer-based particles; and
    an additive imparting biodegradability specifically in an ecological biome in which the three-dimensional object is placed for disposal, the additive being in a weight fraction of about 0.05 to about 5% based on a total weight of polymeric components in the building material,
    wherein the building material has a biodegradability according to ASTM D 5511-18 after about 83 days of at least 2 wt.-% relative to the total weight of the polymeric components, and/or which has a biodegradability according to ASTM D 5511-18 after about 155 days, of at least 2 wt.-% relative to the total weight of the polymeric components.

2. The building material according to claim 1, wherein the weight fraction of the additive, based on the total weight of polymeric components in the building material, is at least 0.1 and/or at most 3% by weight.

3. The building material according to claim 1, wherein the additive is incorporated into the polymer-based particles.

4. The building material according to claim 1, wherein the additive further contains a component selected from starch and/or starch mixtures, mixtures of organic acids and polyesters, and fractal polymers.

5. The building material according to claim 1, wherein the additive further contains a fatty acid for compatibilization with the polymer of the plastic powder.

6. The building material according to claim 1, wherein the polymer-based particles comprise at least one polymer, co-polymer or polymer blend selected from the group consisting of polyamides, polyolefins, polyether block amides (PEBA), polystyrene, polyaryletherketones, thermoplastic polyurethanes, polyesters, polyethers, polyhydroxy acids, polylactides, polyphenylene sulfides, polyphenylene oxides, polyimides, polyetherimides, and polycarbonates.

7. The building material according to claim 1, wherein the polymer-based particles have a mean particle diameter, determined by laser diffraction, in a range from about 20 μm to 100 μm.

8. The building material according to claim 1, further comprising additional particles of an NIR radiation absorbing material, which are present separately in a mixture with the polymer-based particles, absorbed onto a surface of the polymer-based particles or incorporated into the polymer-based particles.

9. A three-dimensional object, which is produced by solidification of the building material according to claim 1 at points corresponding to a cross-section of the three-dimensional object in respective layers by exposure to radiation.

10. A method for producing a three-dimensional object by solidifying the building material according to claim 1 at points corresponding to a cross-section of the three-dimensional object in respective layers, wherein the building material is selectively solidified by action of electromagnetic radiation emitted by a radiation source.

11. A system for production of three-dimensional objects by solidifying the building material according to claim 1 at points corresponding to a cross-section of the three-dimensional object in a respective layer, wherein the system has at least one radiation source that is designed to emit electromagnetic radiation, a process chamber that acts as an open container and is designed with a container wall, a carrier located in the process chamber, the process chamber and carrier being movable relative to one another in a vertical direction, the system having a storage container and a coater movable in the horizontal direction, wherein the storage container is at least partially filled with the building material according to claim 1.

12. The method according to claim 10, wherein the radiation source emits light of a wavelength in the range from 500 to 1500 nm, or light of a wavelength of about 10.6 μm or in the range of 4.8 to 8.3 μm.

13. The method according to claim 10, wherein the radiation source comprises at least one laser.

14. A method for producing a building material comprising:
processing polymer-based particles an additive by mixing without adding a solvent, or by coextrusion and subsequently to one or more of milling, fiber spinning and fiber cutting, melt spraying, microgranulating, or by complete or partial dissolution in a solvent by adding the additive to the solution and then precipitation and/or spray drying polymer-based particles with incorporated additive, or by impregnation of the polymeric component with a solution or dispersion of the additive in a fluid,
wherein the building material is used in additive manufacturing of a three-dimensional object by selective solidification at points of respective layers corresponding to cross-sections of the three-dimensional object by exposure to radiation, and wherein the building material comprises:
the polymer-based particles; and
the additive, which imparts biodegradability specially in an ecological biome in which the three-dimensional object is placed for disposal, the additive being in a weight fraction of about 0.05 to about 5% based on a weight of polymeric components in the building material.

* * * * *